US012805513B2

(12) United States Patent
Smalley et al.

(10) Patent No.: US 12,805,513 B2
(45) Date of Patent: Nov. 24, 2026

(54) PEST REPELLANT SYSTEM WITH COMPLIANT ARCHITECTURE

(71) Applicant: Symterra, Inc., Tucson, AZ (US)

(72) Inventors: John Smalley, Tucson, AZ (US); David Rogers, Tucson, AZ (US)

(73) Assignee: Bird-X, Inc., Elmhurst, IL (US)

( * ) Notice: Subject to any disclaimer, the term of this patent is extended or adjusted under 35 U.S.C. 154(b) by 0 days.

(21) Appl. No.: 19/310,797

(22) Filed: Aug. 26, 2025

(65) Prior Publication Data

US 2026/0198481 A1 Jul. 16, 2026

Related U.S. Application Data

(63) Continuation of application No. 18/376,335, filed on Oct. 3, 2023, now Pat. No. 12,396,451.

(51) Int. Cl.
*A01M 29/26* (2011.01)

(52) U.S. Cl.
CPC .................................. *A01M 29/26* (2013.01)

(58) Field of Classification Search
CPC ..... A01M 29/26; A01M 29/16; A01M 31/002
See application file for complete search history.

(56) References Cited

U.S. PATENT DOCUMENTS

| | | | | | |
|---|---|---|---|---|---|
| 5,832,657 | A * | 11/1998 | Jan | A01M 31/002 116/22 A |
| 5,896,696 | A * | 4/1999 | Stokes | A01M 1/226 43/132.1 |
| 6,250,255 | B1 * | 6/2001 | Lenhardt | A01M 29/16 119/713 |
| 9,775,337 | B2 * | 10/2017 | Duncan | A01M 29/18 |
| 11,291,198 | B2 * | 4/2022 | Carnell | A01M 19/00 |
| 2018/0084774 | A1 * | 3/2018 | Stoll | A01M 29/28 |
| 2019/0008131 | A1 * | 1/2019 | Austin | A01M 1/026 |
| 2021/0029983 | A1 * | 2/2021 | Deering | A01M 1/026 |
| 2023/0240281 | A1 * | 8/2023 | De Samber | A01K 61/10 119/215 |

* cited by examiner

*Primary Examiner* — Yvonne R Abbott-Lewis
(74) *Attorney, Agent, or Firm* — Secant IP, PLLC

(57) ABSTRACT

The present disclosure provides a pest repellant system that includes pulse generator circuitry to generate pulses from a power source. The frequency and amplitude of the pulses are selected based on a selected pest species. One or more emitters are coupled to the pulse generator to generate pulsed fields to interfere with navigational/landing/nesting abilities of the selected pest species. The pulse generator circuitry includes filter circuitry to remove/attenuate unwanted frequency components of the pulses, in accordance with regulatory and/or government requirements. The pulse generator circuitry is encased in a housing structure to provide moisture and tamper resistance in accordance with regulatory and/or government requirements.

6 Claims, 2 Drawing Sheets

PEST REPELLANT SYSTEM WITH COMPLIANT ARCHITECTURE

CROSS-REFERENCE

This application is a Continuation of Ser. No. 18/376,335, filed Oct. 3, 2023, which is hereby incorporated by reference in its entirety.

TECHNICAL FIELD

The present disclosure relates to pest repellant systems, and, more particularly, to pest repellent systems with regulatory and/or governmental compliant architecture.

BACKGROUND

Bird pest management is a significant problem in a wide variety of commercial, municipal and military concerns. Several products exist on the market for bird abatement and control, for example, spikes, roof coatings, high frequency sonic generators, etc., however, none of the currently available bird abatement approaches provide a lasting and consistent deterrence for birds to land and/or nest in unwanted areas. Birds are known to be disease carriers, and are known to cause significant damage to structures (e.g., buildings, billboards, farm and livestock areas, etc.). Thus, workers assigned for bird cleanup and bird damage repair are often exposed to toxic work environments, and are also often exposed to hazardous work environments from the corrosive effects of bird droppings and urine, the build-up of bird droppings and urine, etc.

As is known for particular bird species of pigeons (members of *Columbidae* family), low power electromagnetic pulses of a particular frequency (approximately 120 Hz) can interfere with birds'ability to navigate. Such electromagnetic pulses can be used to deter and repel birds from landing and/or nesting on or near structures or areas, for example, buildings, billboards, farm and livestock shelters, airport and airfield areas, etc. However, it is not known in the art the particular frequency needed to deter other varieties of bird species. In addition, it is not known in the art a signal strength needed to deter varieties of bird species. In addition, for pigeon deterrence using pulsed electromagnetic signals at approximately 120 Hz, it is not known if pigeons will eventually adapt to that frequency and return to land and/or nest in unwanted areas.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
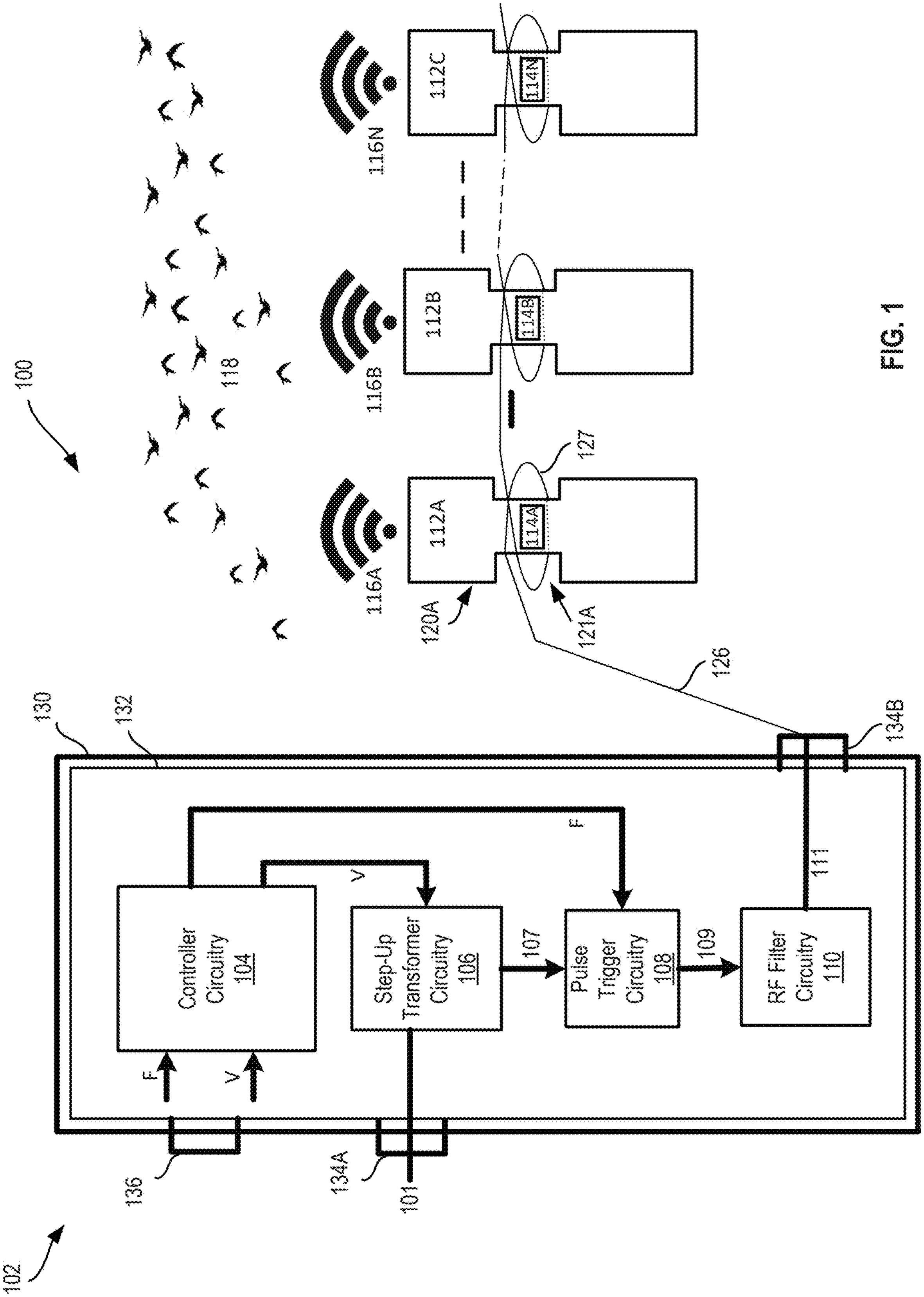
FIG. 1 illustrates a pest repellent system according to embodiments of the present disclosure.

FIG. 1 illustrates a pest repellant system 100 according to embodiments of the present disclosure. While the following description is in reference to a pet repellent system specific to birds (and, more specifically, to pigeon species), the teachings of the present disclosure may be applied to different kinds of pests, including, for example, avian pests (birds, bats, flying insects (e.g., bees, wasps, hornets, etc.) and/or ground pests including, for example, rodents, insects, etc. As a general matter, the teachings of the present disclosure may apply to any pest species that uses innate navigational abilities. The system 100 includes a pulse generator 102 generally configured to generate a frequency-controlled and/or voltage-controlled pulse train 111 from a power source 101, for example an AC power source 101. The AC power source 101 may include conventional residential and/or commercial AC power, for example, 110/120 V. AC at 60 Hz, 220 V. AC at 60 Hz, 480 V. AC at 60 Hz, and/or other conventional and/or proprietary AC power source. The following description will be in reference to a conventional 110/120 V. AC power source operating at 60 Hz, however the teachings of the present disclosure can be applied to any AC power source.

The system 100 also includes one or more emitters 112A, 112B, . . . , 112N generally configured to generate a respective pulsed electromagnetic signal 116A, 116B, . . . , 116N in response to the pulse signal train 111. The emitters 112A, 112B, . . . , 112N may be placed on or near structures, for example, billboards, rooftops, etc., and/or on or near specified areas, for example, fields, entryways, private/commercial/military airfield facilities, etc., so that the pulsed electromagnetic field signal 116A, 116B, . . . , 116N repel birds away from those structure/areas, as generally illustrated by the flock of birds 118 moving away from the emitters 112A, 112B, . . . , 112N in response to the presence of the pulsed electromagnetic field signals 116A, 116B, . . . , 116N. The number of emitters 112A, 112B, . . . , 112N may be selected for a given operating environment and/or to provide coverage for a selected area, such that a sufficient number of emitters 112A, 112B, . . . , 112N are selected to generate a sufficient field strength to avoid coverage gaps, thus preventing birds to land/nest in unwanted areas. For example, to deter pigeons from landing/nesting on a billboard structure, the emitters 112A, 112B, . . . , 112N may be spaced approximately 3-10 feet apart along the base or catwalk of a billboard. As another example, to deter pigeons form landing/nesting on a rooftop of a building or other structure the emitters 112A, 1102, . . . , 112N may be spaced approximately 3-10 feet apart along the peak and/or periphery of the rooftop.

The emitters 112A, 112B, . . . , 112N are illustrated in cross section in FIG. 1. Using emitter 112A as an example, the emitter generally includes an insulative body 120A and a metallic disk 114A disposed within the insulative body 118A. The insulative body 120A may be formed of any suitable non-conductive material such as plastic, polyethylene, silicon, etc. and such material may be selected to have a desired hardness and/or weather resistance and/or UV resistance for a given operating environment. The insulative body 120A may also include a notch 121A extending around the body. The metallic disk 114A may be disposed within the body 120A and positioned adjacent the notch 121A, as illustrated. The metallic disk 114A may be formed of any ferrous and/or conductive material such as for example a metal formed of steel, iron, etc.

The system 100 also includes a conductive wire 126 coupled to the pulse generator 102 and to the emitters 112A, 112B, . . . , 112N. The conductive wire 126 is selected to have sufficient strength, depending on the length needed to reach all of the emitters 112A, 112B, . . . , 112N from the pulse generator 102, and sufficient diameter to properly conduct relatively high voltages (e.g., 1 kVAC-4 kVAC) of the pulse signal train 111 without significant resistance. In some example embodiments, and again using emitter 112A as an example, the conductive wire 126 is looped 127 around the body 120A and disposed within the notch 121A, i.e., so that the loop of conductive wire 126 surrounds, at least in part, the metallic disk 114A disposed within the body 120A. The metallic disk 114A, in response to the pulses 111 in the wire 126, operates to generate the pulsed electromagnetic signal 116A. The emitters 112B, . . . 112N may be similarly constructed and operate in a similar manner as emitter 112A, described above.

The pulse generator 102 generally includes controller circuitry 104 generally configured to provide voltage and/or frequency control of the pulse signal 111, as described below. The pulse generator 102 also includes controllable step-up transformer circuitry 106 coupled to the power source 101 and configured to generate a controllable stepped-up voltage output 107, for example, in a range of 1000-4000 Volts (V). As a general matter, the controller circuitry 104 is configured to control the controllable transformer circuitry 106 based on user-selectable and/or programmed voltage control signal (V). To that end, the controllable transformer circuitry 106 may include tap sections to enable controlled changes in the output voltage 107. In some embodiments, output capacitance and/or rectifier circuitry (not shown) may be coupled to the transformer circuitry 106 to convert the output voltage 107 from AC to DC. Of course, in other embodiments, other known and/or after-developed controllable transformer circuitry may be used, depending on, for example, operating conditions, engineering tolerances, cost considerations, weight considerations, etc.

The pulse generator 102 also includes pulse trigger circuitry 108 generally configured to generate a pulse signals 109, at a selectable/controllable frequency F, based on the output voltage 107 from the transformer circuitry 106. The pulse trigger circuitry 108 is generally configured as a momentary ON device, to generate pulse signals 109 having a selected frequency (F) and an amplitude (voltage level) of the output voltage 107 from the transformer circuitry 106. In some example embodiments, the selected frequency F of the pulse signals 109 is approximately 120 Hz.

The pulse generator 102 also includes radio frequency (RF) filter circuitry 110, generally configured to remove and/or attenuate unwanted frequency components of the pulse signals 109, and generate filtered pulse signals 111. The filter circuitry 110 may include known RF filter circuits, for example, bandpass filter, notch filter, low pass filter, etc. As may be appreciated, certain operating environments (e.g., airports, etc.) and/or government regulatory agencies (e.g., Underwriters Laboratories (UL), Conformité Européenne CE, etc.) may require strict control of RF "bleed" from electronic devices. The filter circuitry 110 may therefore be selected to remove and/or attenuate RF frequency components and/or harmonic content to meet operational and/or governmental requirements.

The pulse generator 102 may also include a housing structure 130 to enclose the electronic components described above. In some embodiments, the housing structure 130 may be a water-tight and/or moisture resistant structure and may be formed from plastic, metal and/or composite materials. The housing structure 130 may fully encapsulate the electronic components to prevent accidental contact. In some embodiments, the housing structure may comply with ingress protection code (e.g., IP65 rated enclosure, IP68 rated enclosure, etc.) defined by the International Electrotechnical Commission (IEC) under the international standard IEC 60529. The housing structure 130 may be a unitary construction (i.e., no openings, no access to internal components) or the housing structure 130 may include a removable portion (e.g., removable lid) to allow access to internal components. In some embodiments, RF/electromagnetic shielding 132 may be disposed (in whole or in part) within the housing structure 130 to reduce and/or attenuate unwanted electromagnetic signals from escaping the housing structure 130 during operation of the pulse generator 102. Such shielding 132 may include, for example, a metallic lining disposed adjacent to the electronic components, and/or other shielding material as would be understood by one skilled in the art.

The housing structure 130 may also include water-tight seals for each ingress point on the housing structure 130. For example, a water-tight seal 134A may be used to form a water-tight opening for a power cable associated with the power source 101. Similarly, a water-tight seal 134B may be used to form a water-tight opening for the conductive wire 126. In some embodiments, the pulse generator 102 may include one or more user interfaces 136 to enable a user to input operational commands. For example, user interface 136 may include buttons, knobs, etc. to enable a user to adjust voltage parameters (V) and or frequency parameters (F). Such user interfaces 136 may also be embodied as water-tight sealed mechanisms to prevent moisture from entering the housing 130.

In one example embodiment, the controller circuitry 104 may generate a voltage control signal V based on a user-specified voltage. For example, the user-specified voltage V may be derived from a user interface (136) associated with the pulse generator 102. The user interface 136 may include, for example, a knob that a user can rotate to select a desired voltage output 107 of the transformer 106. In other embodiments, the user interface 136 may be embodied as a display that can be accessed by a user to select a desired voltage output 107. The controller circuitry 104 causes the transformer circuitry 106 to generate the output voltage 107 having a voltage level based on the user-supplied input V. Controlling the output voltage 107 also controls the voltage of the pulse signals 111, and thus controls the signal strength of the pulsed electromagnetic field signals 116A, 116B, . . . , 116N.

In another example embodiment, the controller circuitry 104 may generate a voltage control signal based on a pest specific voltage. For example, pulse signals 111 having voltage (amplitude) value of between 1 kV and 4 kV can generate electromagnetic pulses of sufficient strength to deter certain pigeon species away from the emitters 112A, 112B, . . . , 112N. However, other pigeon species, and/or other other bird species, may require a signal strength that is specific within this range and/or greater than (or less than) 1 kV-4 kV to be a deterrence. Accordingly, controller circuitry 104 may be programmed and/or controlled (e.g., externally controlled) to generate a specific voltage control signal V so that the transformer circuitry 106 generates a specified output voltage 107. In other words, the controller circuitry 104 may be "tuned" to a specific pest type, thus enhancing the pest repellent ability of the system 100. By selecting a voltage (or voltage range) for a specific pest type, the teachings of the present disclosure may offer enhanced pest deterrence for targeted pests, while avoiding interference with other animals.

In another example embodiment, the controller circuitry 104 may generate a variable voltage control signal V so that the voltage of operation randomly varies within a selected random voltage range ("Random"). For example, and again using the pigeon example, while the specific voltage to deter some pigeon species is known to be in the range of 1 kV to 4 kV, deterrence of these pigeon species may occur by varying the voltage within this range. Thus, the controller circuitry 104 may generate a variable and random voltage control signal V to cause the output voltage 107 of the transformer 106 to have a random voltage within the range of 1 kV to 4 kV. Of course, this is only an example of the range of voltage operations, and in other embodiments other voltage ranges may be selected. Moreover, in some embodiments, the controller 104 may generate a variable and random voltage control signal V at fixed and/or random intervals. For example, the variable and random voltage control signal V may be generated at user-defined intervals (e.g., every 5 seconds, etc.) or at random intervals within a user-definable range (e.g., 1-20 seconds). It will be appreciated that some bird species may adapt to a fixed operating voltage, thus enabling the birds to land/nest in unwanted areas despite the presence of the pulsed electromagnetic signals 116A, 116B, . . . , 116N. By providing randomness in both voltage and timing, birds may not be able to adapt to such conditions and instead permanently seek other areas to land/nest.

In still another example embodiment, the controller circuitry 104 may generate a variable voltage control signal V so that the voltage of operation incrementally changes within a selected range. Thus, for example, the controller circuitry 104 may generate a variable voltage control signal V to cause the transformer circuitry 106 to generate the output voltage 107 having a selected step value within the range of 1 kV to 4 kV. For example, a step value of 10 may be selected so that the output voltage 107 takes on voltage values incremented and/or decremented by 10 V (resulting in increments of 1 kV, 1010 V, 1020 V, and so on). Of course, this is only an example of a step value and range of voltage operations, and in other embodiments other step values and voltage ranges may be selected. Moreover, in some embodiments, the stepped voltage may be generated at fixed and/or random intervals (timing). For example, the stepped voltage may be generated at user-defined intervals (e.g., every 5 seconds, etc.) or at random intervals within a user-definable range (e.g., 1-20 seconds). It will be appreciated that some bird species may adapt to a fixed operating voltage, thus enabling the birds to land/nest in unwanted areas despite the presence of the pulsed electromagnetic signals 116A, 116B, . . . , 116N. By providing stepped voltage values at selected and/or random intervals, birds may not be able to adapt to such conditions and instead permanently seek other areas to land/nest.

In another example embodiment, the controller circuitry 104 may generate a frequency control signal F based on a user-specified frequency. For example, the user-specified frequency F may be derived from a user interface (136) associated with the pulse generator 102. The user interface 136 may include, for example, a knob that a user can rotate to select a desired frequency of the pulse signals 111. In other embodiments, the user interface 136 may be embodied as a display that can be accessed by a user to select a desired frequency. The controller circuitry 104 causes the pulse trigger circuitry 108 to generate the pulse signals 111 having a frequency based on the user-supplied frequency input F. Controlling the frequency of the pulse signals 111 also controls the frequency of the pulsed electromagnetic field signals 116A, 116B, . . . , 116N.

In other embodiments, and similar to the voltage control described above, the controller circuitry may control the frequency of operation based on pest-specific criteria and/or random as frequency control (within a selected frequency range). By selecting a frequency (or frequency range) for a specific pest type, the teachings of the present disclosure may offer enhanced pest deterrence for targeted pests while avoiding interference with other animals. By providing randomness in both frequency and timing, birds may not be able to adapt to such conditions and instead permanently seek other areas to land/nest.

Figure 2B:
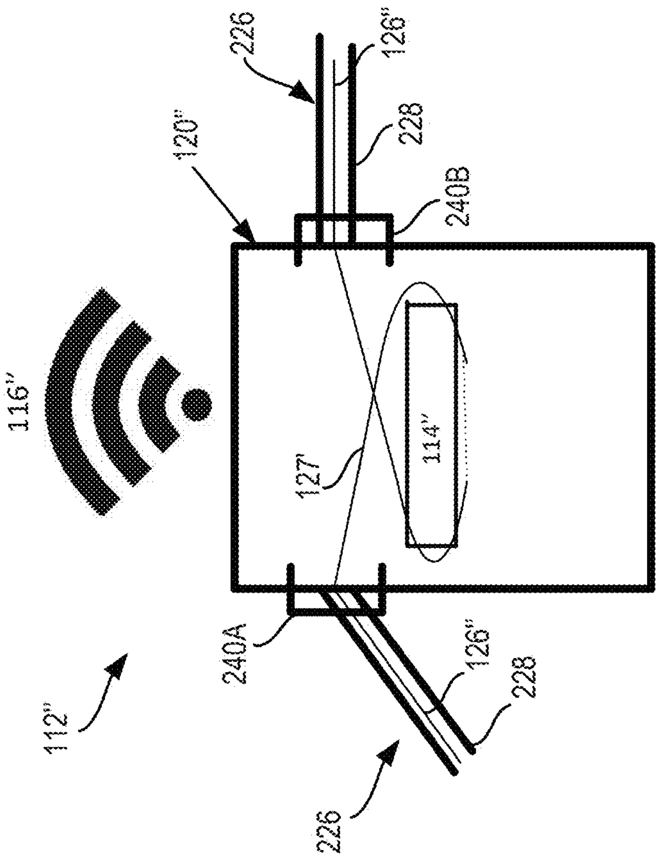
FIG. 2B illustrates a cross-section of an emitter according to another embodiment of the present disclosure.
Figure 2A:
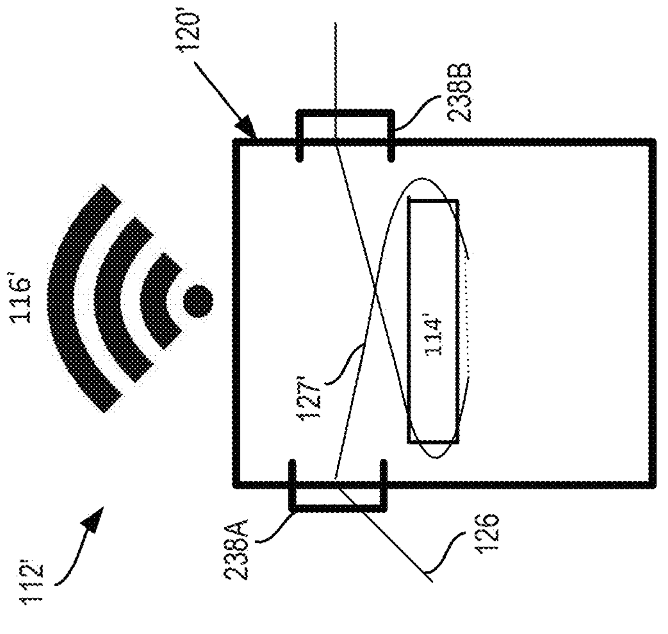
FIG. 2A illustrates a cross-section of an emitter according to another embodiment of the present disclosure.

FIG. 2A illustrates a cross-section of an emitter 112' according to another embodiment of the present disclosure. In this embodiment, the loop of conducting wire 126 is formed internally within the body 120' of the emitter 112'. Connector 238A is provided to couple the conductive wire 126 to the internal loop 127' of wire surrounding the disk 114'. Similarly, connector 238B is provided to couple the internal loop 127' of wire surrounding the disk 114' to a next segment of conductive wire leading to the next emitter in the series (as shown in FIG. 1). Connectors 238A and 238B may include, for example, water-tight snap-fit connectors, screw-type connectors, etc. In some embodiments, connector 238B may be omitted in the case of the emitter being the last in the signal chain. As illustrated, the body 120' of the emitter 112' may have generally rectangular cross-section. In other embodiments, the cross-sectional shape of the emitter 112' may include, for example, round-top, disk-shaped, square, and/or other shapes that may be selected for space and/or aesthetics of a given installation environment. In addition, and with reference to FIG. 1, the emitters may be embodied as preformed emitter strings with an emitter at selected intervals (e.g., 6 ft.) along the length of a continuous conductive wire (thus eliminating the need for connectors 238A and 238B). In addition, the disk 114' is illustrated has having a generally rectangular cross section. In other embodiments, the shape and/or dimension of the disk 114' may be selected to provide optimal electromagnetic cooperation with the pulses in the loop 127'.

FIG. 2B illustrates a cross-section of an emitter 112" according to another embodiment of the present disclosure. In this embodiment, the conductive wire 226 is embodied as an insulated cable, having the conductive wire 126" surrounded by an insulative jacket 228. Similar to the previous embodiment, the loop 127' of conducting wire 126" is formed internally within the body 120" of the emitter 112". Connector 240A is provided to couple the conductive wire 126" to the internal loop 127' of wire surrounding the disk 114". Similarly, connector 240B is provided to couple the internal loop 127' of wire surrounding the disk 114" to a next segment of conductive wire leading to the next emitter in the series (as shown in FIG. 1). Connectors 240A and 240B may include, for example, water-tight snap-fit connectors, screw-type connectors, etc. In some embodiments, connector 240B may be omitted in the case of the emitter being the last in the signal chain. As illustrated, the body 120" of the emitter 112" may have generally rectangular cross-section. In other embodiments, the cross-sectional shape of the emitter 112" may include, for example, round-top, disk-shaped, square, and/or other shapes that may be selected for space and/or aesthetics of a given installation environment. In addition, and with reference to FIG. 1, the emitters may be embodied as preformed emitter strings with an emitter at selected intervals (e.g., 6 ft.) along the length of a continuous conductive wire (thus eliminating the need for connectors 238A and 238B). In addition, the disk 114" is illustrated has having a generally rectangular cross section. In other embodiments, the shape and/or dimension of the disk 114" may be selected to provide optimal electromagnetic cooperation with the pulses in the loop 127".

As used in this application and in the claims, a list of items joined by the term “and/or” can mean any combination of the listed items. For example, the phrase “A, B and/or C” can mean A; B; C; A and B; A and C; B and C; or A, B and C. As used in this application and in the claims, a list of items joined by the term “at least one of” can mean any combination of the listed terms. For example, the phrases “at least one of A, B or C” can mean A, B; C; A and B; A and C; B and C; or A, B and C.

“Circuitry”, as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including hardware embodiments of accelerators such as neural net processors and non-silicon implementations of the above. The circuitry may, collectively or individually, be embodied as components that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, instructions that when executed by circuitry perform the operations. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications, Reference throughout this specification to “one embodiment” or “an embodiment” means that a particular feature, structure, or characteristic described in connection with the embodiment is included in at least one embodiment. Thus, appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

What is claimed is:

1. A pest repellant system, comprising:

a water-resistant housing structure;

transformer circuitry, disposed within the water-resistant housing structure, to generate a step-up voltage output from a voltage source;

pulse trigger circuitry, disposed within the water-resistant housing structure, to generate pulse signals having a selected frequency;

filter circuitry, disposed within the water-resistant housing structure, to filter signal components in the pulse signals;

controller circuitry, disposed within the water-resistant housing structure, to control the pulse trigger circuitry to control the frequency of the pulse signals based on, at least in part, based on a selected species of pest; and an insulated conducting wire to receive the plurality of pulses and to generate a pulsed electromagnetic signal having frequency based on the frequency of the plurality of pulses.

2. The system of claim 1, wherein the housing structure is a water-resistant housing structure in compliance with an IP65 or IP68 standard.

3. The system of claim 1, wherein the filter circuitry being selected from a notch filter, a bandpass filer, or a low pass filter, and wherein the filter circuitry to attenuate frequency components in the pulses in compliance with a regulatory and/or governmental restriction on impermissible frequency components in the pulses.

4. The system of claim 1, wherein the housing structure further includes radio frequency (RF) shielding disposed withing the housing, the RF shielding to attenuate frequency components in the pulses in compliance with a regulatory and/or governmental restriction on impermissible frequency components in the pulses.

5. The system of claim 1, wherein the housing structure further includes at least one connector to provide power input or output from the housing, the connector being a water-resistant connector in compliance with a regulatory and/or governmental requirements for water resistance.

6. The system of claim 1, wherein the controller circuitry is further configured to control the transformer circuitry to generate the voltage output having a voltage level based on, at least in part, a selected species of pest.

* * * * *